United States Patent [19]

Willemsen

[11] 4,431,017
[45] Feb. 14, 1984

[54] PIPE TAPPING METHOD AND APPARATUS

[75] Inventor: Albert Willemsen, Mulgrave, Australia

[73] Assignee: James Hardie & Coy Pty. Limited, Sydney, Australia

[21] Appl. No.: 272,690

[22] Filed: Jun. 11, 1981

[30] Foreign Application Priority Data

Jun. 30, 1980 [AU] Australia ............... PE4271

[51] Int. Cl.³ ............................................. F16K 43/00
[52] U.S. Cl. ..................... 137/15; 137/318; 408/87; 408/92; 408/100
[58] Field of Search .................. 137/15, 318; 408/87, 408/92, 100, 104, 105

[56] References Cited

U.S. PATENT DOCUMENTS

| 438,740 | 10/1890 | Eley | 137/15 |
| 1,603,537 | 10/1926 | Hathaway | 408/92 |
| 1,956,129 | 4/1934 | Mueller et al. | 137/318 |
| 2,115,992 | 5/1938 | Koppl | 137/318 |
| 3,827,448 | 8/1974 | Alba | 137/318 |

FOREIGN PATENT DOCUMENTS

| 2162240 | 8/1973 | Fed. Rep. of Germany | 408/105 |
| 2941 | of 1878 | United Kingdom | 408/92 |
| 205537 | 10/1923 | United Kingdom | |
| 263367 | 12/1926 | United Kingdom | |
| 980574 | 1/1965 | United Kingdom | |

*Primary Examiner*—George L. Walton
*Attorney, Agent, or Firm*—LeBlanc, Nolan, Shur & Nies

[57] ABSTRACT

To tap a main pipe for connection of a branch pipe thereto, a tubular enclosure is applied to the main so that one end of the enclosure is formed by the main pipe side-wall to be holed. A drill is penetrated through the main pipe side-wall from the interior of the enclosure while being operated from outside the enclosure; the enclosure having its end remote from the main pipe filled by a removable plug which acts as a bearing for the drill-shaft. The enclosure is equipped with a closure member (such as that of a gate valve) which is used as a lock to prevent movement of the plug during drilling. After drilling, the means used to drive the drill are removed and replaced by an extension of the enclosure, the plug is then unlocked so that the plug and the drill retract into the extension under pressure of the main pipe's contents. The closure member is then operated to close the enclosure at a point between the retracted drill and the main pipe, and the tapping completed by removal of the plug, drill and extension from the enclosure.

11 Claims, 14 Drawing Figures

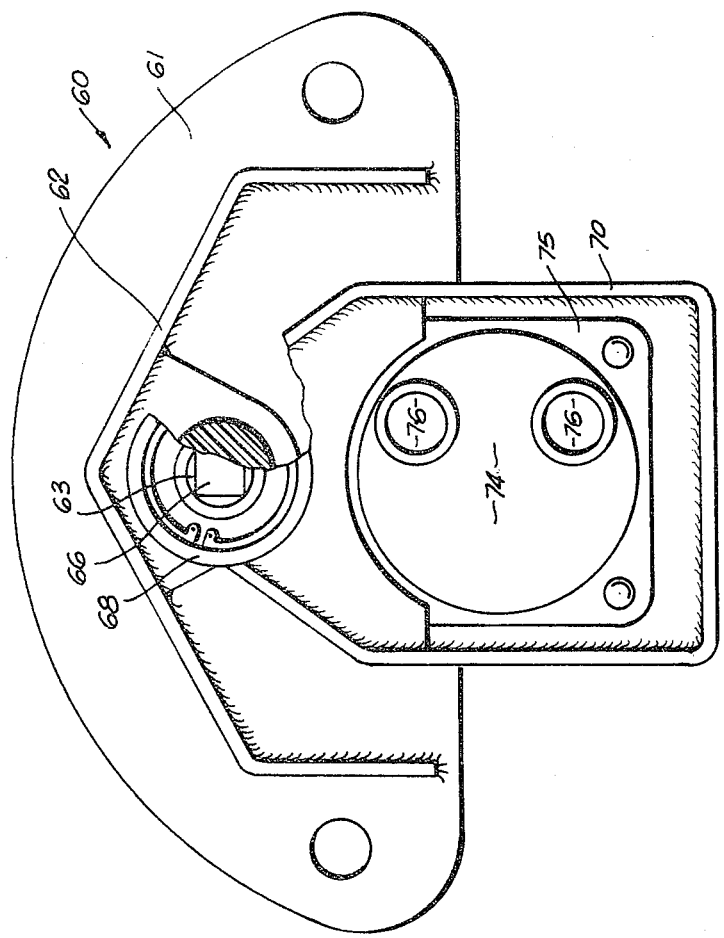

PIPE TAPPING METHOD AND APPARATUS

It is frequently necessary to connect a branch-pipe to a main-pipe. This necessitates drilling a hole in the main pipe to form the entrance to the branch-pipe. The process is known as "tapping".

This invention is applicable to the performance of any such tapping, but the problem which the present invention seeks to resolve arose in relation to the tapping of subterranean water, gas and other mains. Because of this, although not restricted thereto, the invention is described herein primarily in terms of that particular purpose.

The previous ways of tapping a subterranean main are open to objection in several respects. For example, one difficulty is due to the fact that almost invariably a main is required to remain in service as a conveyor for water, or other fluid under pressure, when a tapping is to be made; and, obviously, drilling is best carried out without the inconvenience of fluid escape and without material loss of the fluid. Such escape or loss can be minimised by shutting down the section of the main to be drilled, but that is rarely convenient especially where the main is in constant or protracted service.

Another difficulty is that the existing tapping apparatus is bulky and heavy so that problems arise by way of extensive trench excavation to accommodate the apparatus, and in transport of the apparatus from site-to-site.

The object of this invention is to overcome, or at least ameliorate, the stated difficulties in a simple way.

The invention provides a method of tapping a main pipe for connection of a branch pipe thereto, comprising the steps:

(a) presenting a drill to one side of the main pipe from within a tubular enclosure having a closed outer end portion and having its inner end constituted by the wall of the main pipe to be drilled, (b) rotating the drill and applying endwise pressure to it from outside the enclosure thereby to drill a hole in and through one side of the main pipe, (c) adding a longitudinal extension to the outer end of the enclosure, (d) retracting the drill away from the main pipe, through said outer end portion and at least partly into said extension, (e) applying a transverse closure to the enclosure between the retracted drill and the main pipe, and (f) removing the extension and the drill from the enclosure.

Examples of apparatus for use in performance of the method are illustrated in the drawings herewith:

FIG. 1 is a transverse cross-section of a main pipe showing an inner end portion of an enclosure element secured thereto in relation to the required tapping location.

FIG. 2 repeats FIG. 1, but with a further enclosure element added thereto.

FIG. 3 repeats FIG. 2, but with a remaining enclosure element added, and a drill presented to the main pipe.

FIG. 4 repeats FIG. 3, but with the enclosure ready for drilling and with certain other items for completing a tapping.

FIG. 5 is a partly-sectioned showing of a similar form of the apparatus modified to motorise the drill and provide for facilitated drill feed.

FIG. 6 largely repeats FIG. 5 except for showing a drilling completed.

FIG. 7 substantially repeats FIG. 6 except for showing certain parts about to be removed in dotted lines.

FIG. 8 largely repeats FIG. 7 but with the parts shown dotted in FIG. 7 removed and replaced by an enclosure extension.

Figure 7:
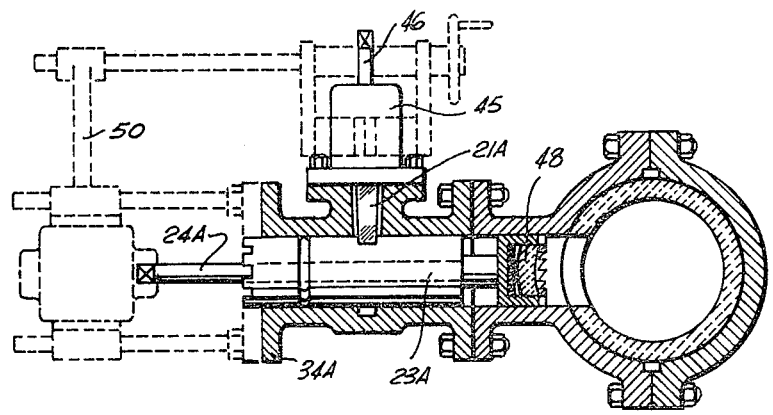
Figure 11:
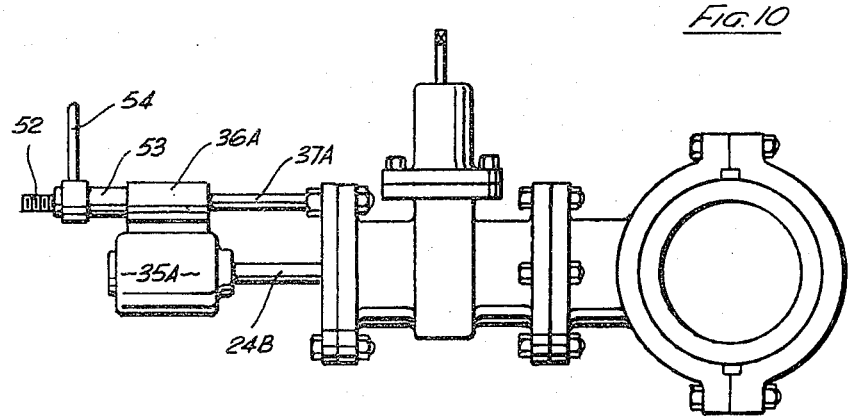

FIG. 11 substantially repeats FIG. 7 except for showing a single modified drill-feed arrangement.

Figure 12:
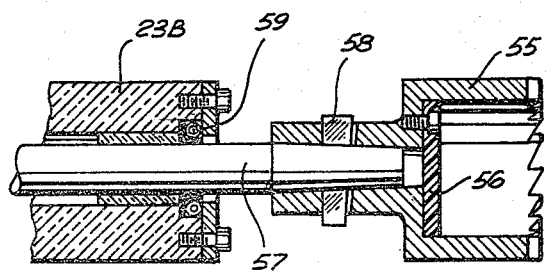

FIG. 12 is a sectioned detail of a drill composed of a drill-shaft and a removable drill-bit in the form of an end mill.

Figure 13:
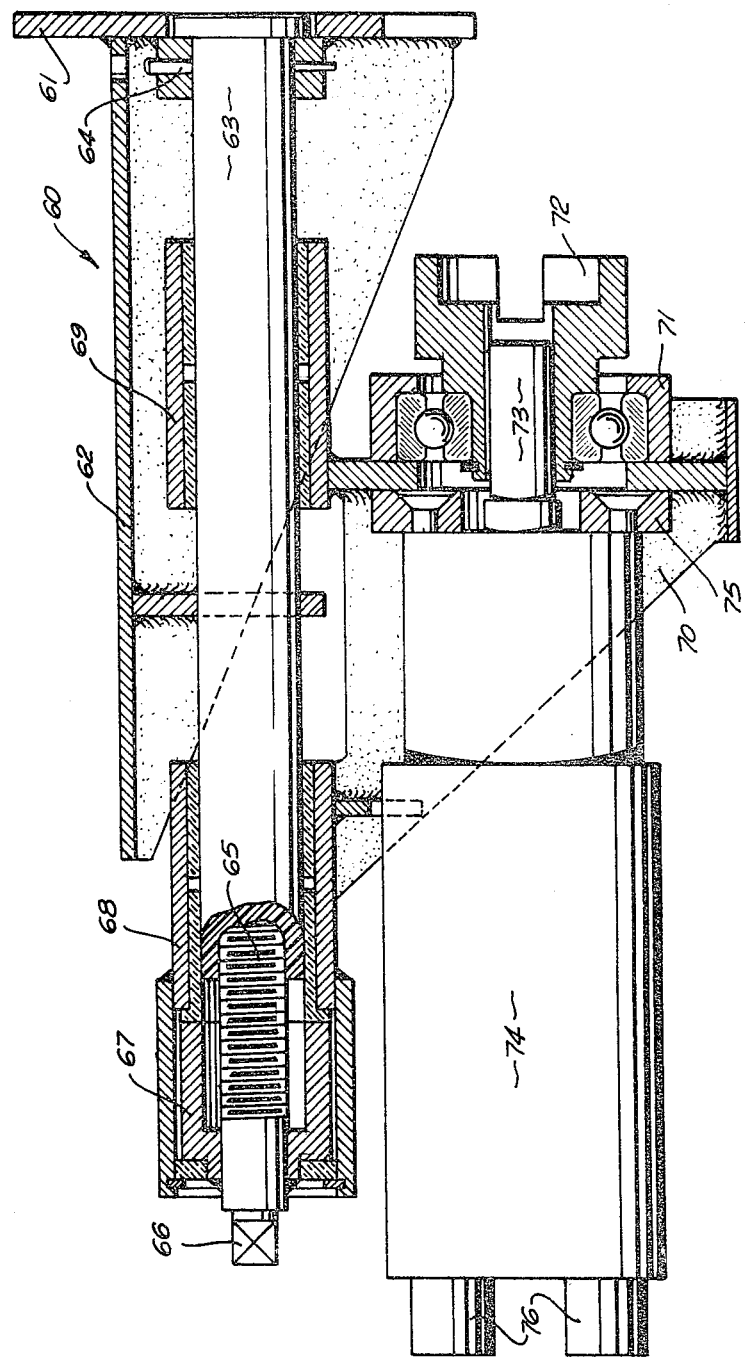

FIG. 13 is a largely sectioned side elevation of a motorised drill arrangement substantially the same in principal as those shown in previous figures but in greater detail in point of mechanical design.

FIG. 14 is an end elevation looking on the left-hand end of FIG. 13.

FIGS. 1 to 4, to which reference is now made, show a form of apparatus which can be effectively operated entirely manually. This apparatus may be used for any tapping operation but is more suited to the tapping of main pipes which are made of relatively soft, easily drilled, material such as plastics, asbestos-cement and the like. These four figures illustrate a sequence of operation constituting a tapping according to the method subject hereof.

The main pipe to be tapped is shown at 15. Once the site for drilling (indicated by 16) has been selected, a tee-piece junction 17 having a tubular offset 18 is applied to the main pipe by being closely clamped thereabout as well understood. The bore 19 of offset 18 is concentric with the hole to be drilled and, of course, the diameter of the hole does not exceed, but usually would be about the same as, that of the bore. The tee-piece 17 forms an inner end portion of the mentioned enclosure and the site portion 16 constitutes (prior to drilling), a closure for the inner end of the enclosure. (The terms "inner" and "outer" as used herein are respectively intended to refer to whether an item is close to the main pipe or remote from it).

Figure 1:
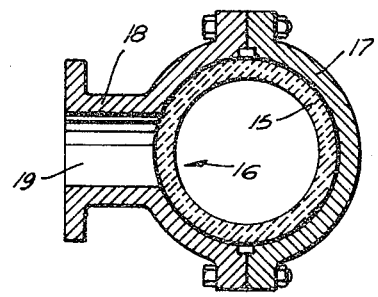
Figure 2:
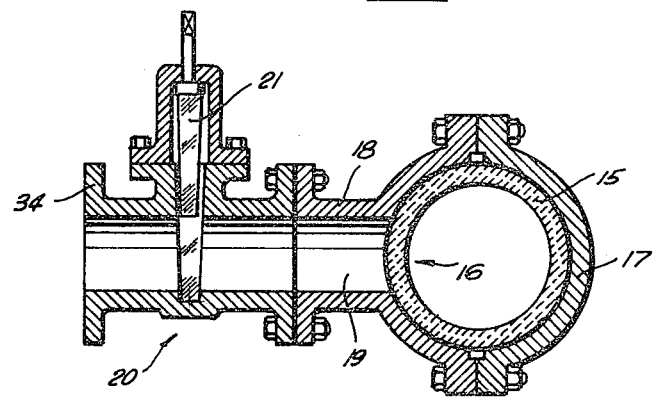

A further portion of the enclosure is shown at 20 (FIG. 2). It is in the form of an ordinary gate valve having a closure member 21. This portion may be some other ordinary valve member provided it is one including a cylindrical body 22 adapted to align co-axially with the bore 19 and provided its closure member can be retracted from the body so as to leave its bore unobstructed.

Figure 3:
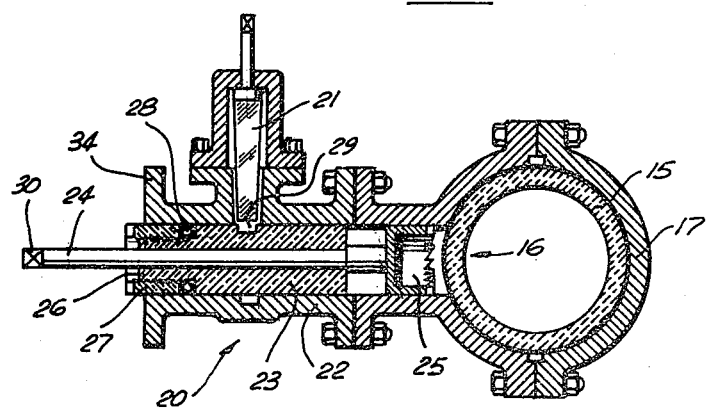

The enclosure is completed by a filler plug 23, inserted in body 22, as shown in FIG. 3. Plug 23 forms a convenient bearing for a drill consisting (in this case) of a drill-shaft 24 and a bit in the form of an end mill 25.

In most cases it is desirable for plug 23 to be sealed within body 22 to prevent leakage of main-pipe (fluid when the drilling has been completed) and also to be restrained against outward movement; this particularly, when the main-pipe fluid is under substantial pressure.

Figure 4:
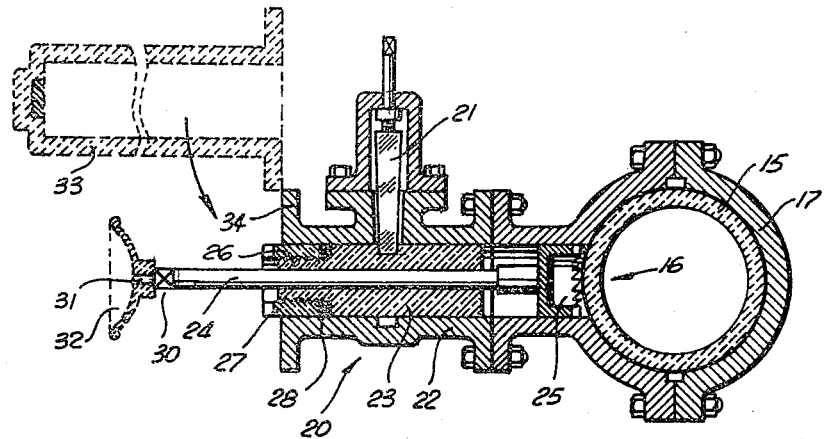

To these ends, plug 23 is provided with a threaded outer end portion 26 able to receive a sleeve nut 27. Nut 27 may be screwed along portion 26 to compress a sealing ring, such as O-ring 28, and thus provide the required seal. To provide positive restraint against axial movement of plug 23, means are provided to key plug 23 relative to body 22. These means may consist of a recess 29 in plug 23 into which the tip of closure member 21 may be entered as shown in FIG. 4.

To perform the drilling, the drill-shaft 24 has to be rotated and longitudinally pressed inwardly. Rotation may be effected by providing shaft 24 with a squared outer end 30 and applying, for example, a ratchet ring spanner to that end. Endwise loading of the shaft may be accomplished by hand, knee or foot pressure applied to outer end 30 and the ring spanner applied to it; in that case however, it is desirable for the end 30, to be provided with an end journal 31 (FIG. 4) upon which a pad 32 (of the type used in a common breast-drill) may be freely rotatably and removably mounted.

When the drilling has been completed the pad 32 (if employed) is removed and enclosure extension (indicated by dotted lines 33 in FIG. 4, but better shown in FIGS. 8 and 9) is added to the outer end of the enclosure. The closure member is then retracted clear of the plug 23 so that the plug 23 and the drill carried by it are moved away from the main-pipe under pressure of the fluid therein, and retracted into the extension or at least sufficiently into it to permit the closure member 21 to be moved into its closed position, as a transverse closure of the enclosure, between the retracted drill and the main-pipe 15. Once the member 21 has been moved into its closed position, the drill 24/25, the plug 23 and the extension 33 may all be removed from the body 22, the tapping is complete and a branch-pipe may be secured to the body; for example, by being flanged-bolted to body flange 34.

FIGS. 5 to 10 show tapping apparatus which is largely similar to that described with reference to FIGS. 1 to 4; and, like those earlier figures, they display a sequence of method steps which, in essence, is the same as that described in terms of FIGS. 1 to 4.

In these figures (FIGS. 5 to 10) a main pipe 15A, a tee-piece junction 17A, enclosure portion 20A and a closure member 21A are all as before. In this embodiment, the drill shaft 24A is dis-connectively drive coupled to a motor indicated at 35. This motor may be electrical, hydraulic or pneumatic. A pneumatic motor is preferred.

Motor 35 has a pair of cross-head lugs 36 movable along slide bars 37 removably secured to body flange 34A. An actuating arm 38 is rigidly fixed in relation to motor 35. This arm is furnished with a nut 39 threading on a rotatable lead screw 40 operable by hand-wheel 41. The lead screw 40 is borne, and restrained against endwise movement, within a sleeve bearing 42 mounted on a pair of arms 43 stationarily mounted in relation to the gate valve. For example, by being fixed to a mounting collar 44 firm-fitting on, but removable from, a cover 45 being part of the gate valve, or its equivalent. The arms 43 are off-set (not shown) relative to the collar 44 to provide sufficient mechanical clearance for operation of the valve spindle 46.

Figure 5:
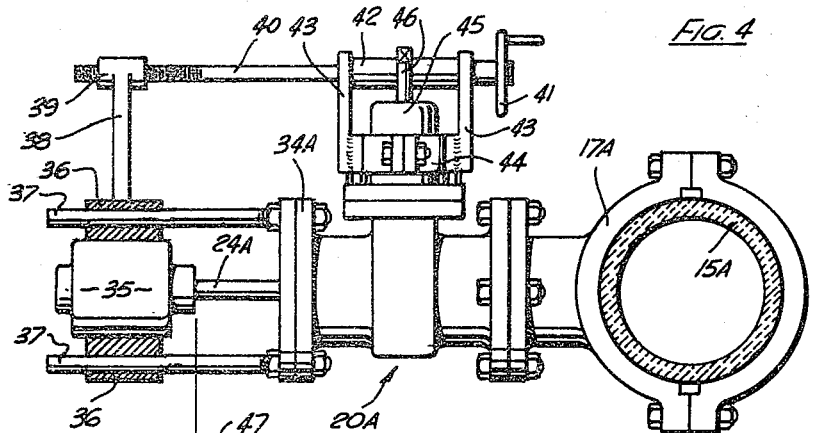
Figure 6:
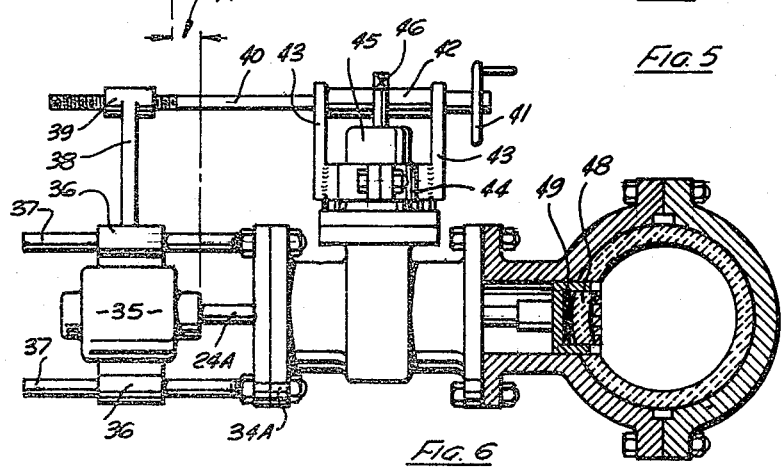

In FIG. 5 the apparatus is set up to make the required drilling, the closure member 21A (shown in FIGS. 7, 9 and 10) being engaged with plug 23A (as shown in FIG. 7) as previously explained. With motor 35 running, appropriate operation of hand-wheel 14 will advance the drill inwardly by an amount substantially equal to the span indicated at 47, and this will suffice to effect the drilling, as shown in FIG. 6. In the process, the coupon 48 is cut out of the main pipe and the pressure in that pipe transfers the coupon inwardly of the cup-shaped drill, also as shown in FIG. 6.

Where the pipe is of ferrous metal the drill may house a magnet 49 which will ensure holding of the coupon within the drill-bit.

Figure 8:
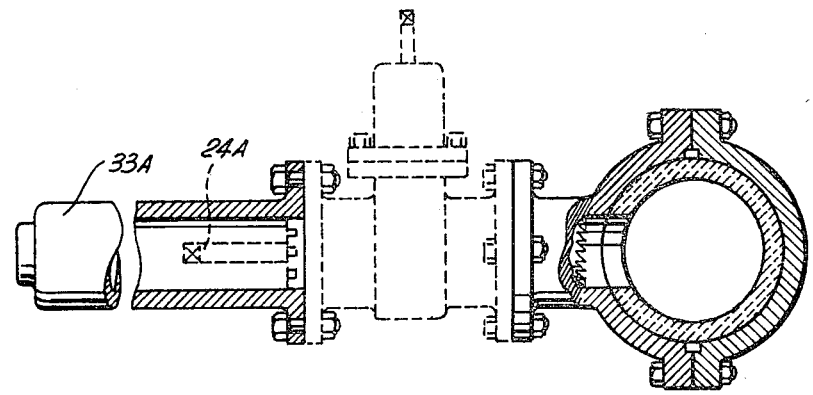
Figure 9:
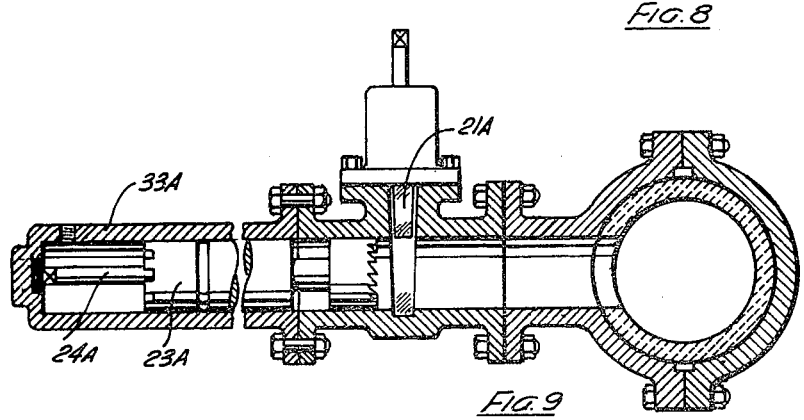
FIG. 9 is sequential to FIG. 8 in showing the drill sufficiently retracted into the enclosure for removal.

FIG. 7 goes a stage further, in that by dotted lines 50 it indicates those parts about to be removed from the enclosure assemblage. Once these items have been removed the enclosure extension 33A is applied as shown in FIG. 8 and upon withdrawal of the closure member 21A, clear of the plug 23A, main pipe pressure will cause the plug and the drill assembly carried by it to retract into extension 33A to the extent indicated in FIG. 9; that is, sufficiently for the closure member 21A to be moved into closed position as shown in FIG. 10.

Figure 10:
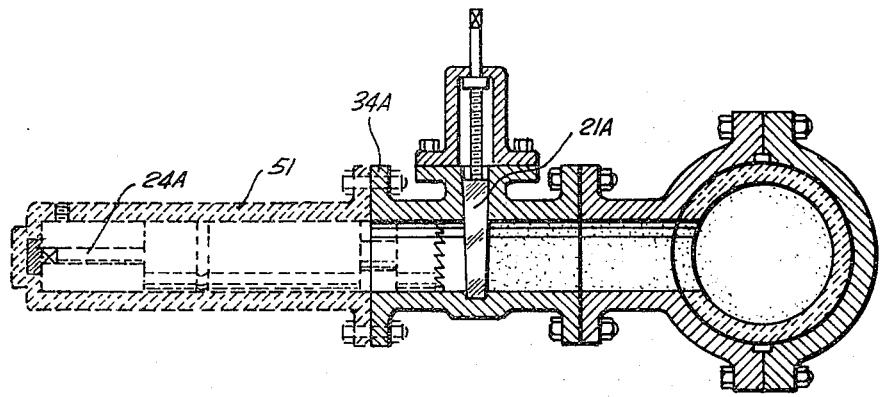
FIG. 10 is sequential to FIG. 9 in showing certain parts about to be removed and the mentioned transverse closure in closed position.

The enclosure and the drill assembly may then be removed as indicated by dotted lines 51 in FIG. 10 and the tapping is thus complete. A branch-pipe may then be connected to flange 34A in conventional manner.

The arrangement shown in FIG. 11 is virtually the same as those previously described except for its modification in respect of motorisation and drill feed. In this connection, the drill shaft 24B is coupled to motor 35A substantially as previously explained. And this motor has a single cross-head lug 36A, slidable along slide-bar 37A, removably fixed on the gate valve body. This slide-bar has threaded end portion 52, and a rotatable nut 53 on the end portion is operable by ratchet ring spanner or the like, as indicated at 54.

FIG. 12 shows a form of drill bit which may be used in any of the embodiments of the invention. It consists of a cup-shaped end mill 55 preferably furnished with a floor magnet 56 and detatchably secured to drill shaft 57 in conventional manner, for example, as indicated by cottar joint 58. The drill shaft 57 is preferably mounted in the plug 23b by way of ball bearings indicated at 59.

The arrangment shown in FIGS. 13 and 14 is, in effect, a mechanical refinement of that shown in FIG. 11. It comprises a support bracket 60 having a mounting flange 61 adapted to be bolted to an enclosure body flange (not shown, but the same as that shown, for example, in FIG. 10). The flange 61 carries an outwardly extending cantilever member 62 to which a tubular shaft 63 is rigidly secured as indicated at 64. The tubular shaft 63 is internally threaded to receive a lead screw 65 having an end piece 66 by which the screw may be rotated. Shaft 65 is rigidly connected to a rotatable ferrule 67 rotatable within cross-head sleeve 68. This sleeve (68) together with that indicated at 69 are thus slidable along shaft 63 and both of these sleeves are fixed in relation to a support bracket 70 providing mounting 71 for a coupling 72 keyed on the shaft 73 of a hydraulic motor 74. This motor is fixed at 75 to the support bracket 70 and is furnished with usual working-fluid inlet and exhaust unions 76, being operable as well understood. In use, the coupling 72 accommodates the outer end of a drill shaft (not shown) such as that marked 67 in FIG. 12.

It will be understood that the several forms of apparatus illustrated in the drawings could be varied without departure from the essence of the invention. For example, (referring to FIG. 2 for instance) the body 22 and offset 18 could be made in one piece. Again, offset 18 could be secured to the main pipe otherwise than by being part of a tee-piece junction such as 17; and the drill feed arrangements could be power operated by being independently motorised or by way of a suitable gear drive from the motor used for drill rotation.

I claim:

1. A method of tapping a main pipe for connection of a branch pipe thereto, comprising the steps:

(a) presenting a drill to one side of the main pipe from within a tubular enclosure including a valving means, the tubular enclosure having a closed outer end portion and having its inner end constituted by and sealed against the wall of the main pipe to be drilled, the drill including guide means in sealed engagement within said tubular enclosure, and a structural cooperation being provided within the tubular enclosure between the valving means and the drill guide means that maintains said tubular enclosure as a sealed chamber as well as retaining the drill and its guide means within the tubular enclosure after drilling the pipe and until a longitudinal extension can be added to the tubular enclosure, (b) rotating the drill and applying endwise pressure to it from outside the enclosure thereby to drill a hole in and through one side of the main pipe, (c) after drilling, adding a longitudinal closed end extension to the outer end of the enclosure, (d) releasing the structural retaining cooperation between the valving means and the drill and its guide means and retracting the drill and its guide means away from the main pipe, through said outer end portion and at least partly into said extension, (e) using the valving means to apply a transverse valve closure across the tubular enclosure and between the retracted drill and the main pipe, and (f) removing the longitudinal extension and the drill from the tubular enclosure.

2. A method according to claim 1 wherein the step of rotating the drill and applying endwise pressure to it, is performed manually.

3. A method according to claim 1 wherein rotation of said drill is performed by a motor.

4. A method according to any one of claims 1, 2 or 3 wherein the application of endwise pressure to said drill is performed by way of mechanised transmission means fixedly mounted in relation to said enclosure and applied to said drill.

5. An apparatus for use in performing a method of tapping a main pipe, comprising:

(a) an inner enclosure portion having a cylindrical bore and secured to the main pipe so that the inner end of said bore defines a drilling site therein, (b) a further enclosure portion comprising a body on the outer end of said inner portion and having a bore in axial continuity with the bore of said inner portion, (c) a drill guide plug placed in the bore of said body to act as an outer end portion of said enclosure, (d) a drill co-axially borne in said plug and comprising a shaft whereof the ends extend beyond the ends of said plug, and a drill-bit on the inner end of said shaft, (e) a first means within said body selectively engageable with said plug to maintain and retain said plug within said body, and to restrain said plug against axial movement relative to said body, (f) a second means removably applicable to the outer end of said shaft to rotate said drill and enable application of endwise pressure thereto, (g) an enclosure extension applicable to the outer end of said body upon removal of said second means from said drill, and a closure member including said first means insertable into said body between said drill and said main pipe upon retraction of said drill, at least partly, into said extension.

6. An apparatus according to claim 5 wherein said inner enclosure portion is an offset of a tee-piece junction clamped about said main pipe.

7. An apparatus according to claim 5 or claim 6 wherein said further enclosure portion is a valve secured to said offset and including said closure member.

8. An apparatus according to claim 5 wherein said plug includes compressible sealing means to fluid-tightly seal said plug in relative to said body.

9. An apparatus according to claim 5 wherein said drill-bit is an end-mill removably fixed on the inner end of said shaft.

10. An apparatus according to claim 5 wherein the said means (f) consist of a spanner operatively but removably applicable to the outer end of said shaft.

11. An apparatus according to claim 5 wherein the said means comprise a motor removably applied to the outer end of said shaft, and manually operably drive transmission devices whereby said motor is axially advanced towards said main pipe.

* * * * *